United States Patent
Suzuki et al.

(10) Patent No.: US 10,196,487 B2
(45) Date of Patent: Feb. 5, 2019

(54) METHOD OF PRODUCING POLYARYLENE SULFIDE

(71) Applicant: Kureha Corporation, Tokyo (JP)

(72) Inventors: Kenji Suzuki, Tokyo (JP); Michihisa Miyahara, Tokyo (JP); Hiroshi Sakabe, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 15/763,243

(22) PCT Filed: Sep. 30, 2016

(86) PCT No.: PCT/JP2016/079128
§ 371 (c)(1),
(2) Date: Mar. 26, 2018

(87) PCT Pub. No.: WO2017/057734
PCT Pub. Date: Apr. 6, 2017

(65) Prior Publication Data
US 2018/0298145 A1    Oct. 18, 2018

(30) Foreign Application Priority Data
Sep. 30, 2015 (JP) ................. 2015-195116

(51) Int. Cl.
*C08G 75/025* (2016.01)
*C08G 75/0259* (2016.01)

(52) U.S. Cl.
CPC ....... *C08G 75/0259* (2013.01); *C08G 75/025* (2013.01)

(58) Field of Classification Search
CPC  C08G 75/14; C08G 75/0263; C08G 75/0268; C08G 75/0259; C08G 75/025; B30B 9/28
See application file for complete search history.

(56) References Cited

U.S. PATENT DOCUMENTS

| | | | |
|---|---|---|---|
| 7,834,133 B2 | 11/2010 | Suzuki | |
| 8,609,790 B2 | 12/2013 | Suzuki et al. | |
| 2005/0228095 A1 | 10/2005 | Onishi et al. | |
| 2006/0074219 A1 | 4/2006 | Kawama et al. | |
| 2006/0084785 A1 | 4/2006 | Sato et al. | |
| 2007/0265425 A1* | 11/2007 | Suzuki | C08G 75/025 528/388 |

FOREIGN PATENT DOCUMENTS

| | | | | |
|---|---|---|---|---|
| CN | 1847315 A | 10/2006 | | |
| CN | 101048443 A | 10/2007 | | |
| CN | 102105513 A | 6/2011 | | |
| JP | 2004244619 A | 9/2004 | | |
| JP | 2014047218 | * | 8/2012 | ............ C08G 75/02 |
| JP | 2014047218 A | 3/2014 | | |
| WO | WO2004060972 A1 | 7/2004 | | |
| WO | WO2006046748 A1 | 5/2006 | | |

OTHER PUBLICATIONS

International Search Report for PCT/JP2016/079128 dated Nov. 15, 2016.
First Office Action from the Korean Intellectual Property Office for KR10-2018-7006531/PCT/JP2016/079128 dated Jul. 5, 2018.
English translation of the International Preliminary Report on Patentability for International Application PCT/JP2016/079128 dated Apr. 3, 2018.
Office Action issued to KR Patent Application No. 10-2018-7006531, dated Jul. 5, 2018 (with complete translation).
Office Action issued to CN Patent Application No. 201680051501. X, dated Jul. 26, 2018 (with complete translation).
First Office Action from the State Intellectual Property Office of China for CN201680051501.X/JPPCT/JP2016/079128 dated Jul. 26, 2018.
Search Report from the State Intellectual Property Office of China for CN201680051501.X/JPPCT/JP2016/079128 dated Jul. 18, 2018.

* cited by examiner

*Primary Examiner* — Shane Fang
(74) *Attorney, Agent, or Firm* — Abel Law Group, LLP

(57) ABSTRACT

The present invention is to provide a method of producing highly pure polyarylene sulfide (PAS) while the produced amount per unit volume is enhanced and side reactions are suppressed. The method of producing PAS according to an embodiment of the present invention, the method including: a preparation step of preparing a mixture containing an organic amide solvent, a sulfur source, water, a dihalo aromatic compound, and an alkali metal hydroxide in an amount that is less than an equimolar amount per 1 mol of the sulfur source; a first-stage polymerization of heating the mixture; an alkali addition step of adding the alkali metal hydroxide, in an amount that is not less than an equimolar amount per 1 mol of the sulfur source, into the mixture that has undergone the first-stage polymerization step; a concentration step of removing at least a part of the organic amide solvent and/or at least a part of the water in the mixture that has undergone the first-stage polymerization step; and a second-stage polymerization step of heating the mixture that has undergone the alkali addition step and the concentration step and continuing the polymerization reaction.

9 Claims, No Drawings

METHOD OF PRODUCING POLYARYLENE SULFIDE

TECHNICAL FIELD

The present invention relates to a method of producing polyarylene sulfide.

BACKGROUND ART

Polyarylene sulfide (hereinafter, also referred to as "PAS"), represented by polyphenylene sulfide (hereinafter, also referred to as "PPS"), is an engineering plastic having excellent heat resistance, chemical resistance, flame retardancy, mechanical strength, electrical characteristics, dimensional stability, and the like. PAS has been widely used in a wide variety of fields, such as electric/electronic devices and devices for automobiles, because PAS can be formed into various shaped products, films, sheets, fibers, and the like by ordinary melt processing methods, such as extrusion molding, injection molding, and compression molding.

Examples of the method of producing PAS include methods described in Patent Documents 1 and 2.

CITATION LIST

Patent Literature

Patent Literature 1: JP 2014-047218 A
Patent Literature 2: WO 2006/046748

SUMMARY OF INVENTION

Technical Problem

Production of PAS has consumed and wasted raw materials due to occurrence of side reactions and employed intense and complicated washing to obtain highly pure PAS. Furthermore, enhancement in produced amount of PAS per unit volume has been demanded from the perspectives of productivity, economy, efficiency, and the like.

The present invention has been completed to solve the problems described above, and a main object is to provide a method of producing PAS that can produce highly pure PAS while the produced amount per unit volume is enhanced and side reactions are suppressed.

Solution to Problem

As a result of diligent research to achieve the object described above, the inventors of the present invention have found that the problems described above can be solved by, in a method of producing PAS, adjusting the content of alkali metal hydroxide to be contained in a polymerization reaction system during a step and by employing, in between steps, a step of concentrating the polymerization reaction system by removing at least a part of an organic amide solvent and/or at least a part of water, and thus completed the present invention. That is, the method of producing PAS according to an embodiment of the present invention can be described as follows.

In the method of producing PAS according to an embodiment of the present invention, the method includes:
a preparation step of preparing a mixture containing an organic amide solvent, a sulfur source, water, a dihalo aromatic compound, and an alkali metal hydroxide in an amount less than an equimolar amount per 1 mol of the sulfur source;

a first-stage polymerization step of initiating a polymerization reaction by heating the mixture and producing a prepolymer having a conversion ratio of the dihalo aromatic compound of 50% or greater;

an alkali addition step of adding the alkali metal hydroxide, in an amount not less than an equimolar amount per 1 mol of the sulfur source, into the mixture that has undergone the first-stage polymerization step;

a concentration step of removing at least a part of the organic amide solvent and/or at least a part of the water in the mixture that has undergone the first-stage polymerization step; and a second-stage polymerization step of heating the mixture that has undergone the alkali addition step and the concentration step and continuing the polymerization reaction.

In the method of producing PAS according to an embodiment of the present invention, in the preparation step, a mixture containing from 0.5 to 0.99 mol of the alkali metal hydroxide per 1 mol of the sulfur source is preferably prepared.

In the method of producing PAS according to an embodiment of the present invention, in the preparation step, a mixture containing 0.5 mol or greater but less than 0.95 mol of the alkali metal hydroxide per 1 mol of the sulfur source is preferably prepared.

In the method of producing PAS according to an embodiment of the present invention, in the concentration step, the organic amide solvent is preferably removed until an amount of the organic amide solvent relative to an amount of the sulfur source becomes 300 g/mol or less.

In the method of producing PAS according to an embodiment of the present invention, in the concentration step, the water is preferably removed until an amount of the water relative to the amount of the sulfur source becomes 2.0 mol/mol or less.

In the method of producing PAS according to an embodiment of the present invention, in the concentration step, at least a part of the organic amide solvent and/or at least a part of the water is preferably removed until a ratio of the water/the organic amide solvent becomes 0.005 mol/g or less.

In the method of producing PAS according to an embodiment of the present invention, the water is preferably removed in the concentration step until a reaction pressure in the second-stage polymerization step becomes 1.0 MPa or less.

In the method of producing PAS according to an embodiment of the present invention, in the second-stage polymerization step, the organic amide solvent and/or the water is preferably removed in the concentration step until a weight of the reaction mixture relative to an amount of the sulfur source becomes 500 g/mol or less.

In the method of producing PAS according to an embodiment of the present invention, the concentration step is preferably performed after the alkali addition step.

In the method of producing PAS according to an embodiment of the present invention, the alkali addition step is preferably performed after the concentration step.

Advantageous Effects of Invention

According to an embodiment of the present invention, a method of producing highly pure PAS while the produced amount per unit volume is enhanced and side reactions are suppressed can be provided.

DESCRIPTION OF EMBODIMENTS

Method of Producing PAS

An embodiment of the method of producing PAS according to the present invention is described below. The method of producing PAS of the present embodiment includes, as main steps, a preparation step, a first-stage polymerization step, an alkali addition step, a concentration step, and a second-stage polymerization step. Furthermore, as desired, the method may also include a dehydration step and/or a post-treatment step. Each of the steps will be described in detail below.

Dehydration Step

The dehydration step is a step that, before the preparation step, discharges a distillate containing water from the reaction system, the reaction system containing a mixture containing an organic amide solvent, a sulfur source, and an alkali metal hydroxide, during the polymerization reaction to the outside the reaction system.

The polymerization reaction of the sulfur source and the dihalo aromatic compound is affected, e.g., promoted or inhibited, by the amount of water present in the polymerization reaction system. Therefore, as long as the water content is a water content that does not inhibit the polymerization reaction, the dehydration step is not necessary; however, the water content of the polymerization reaction system is preferably reduced by performing the dehydration step before the polymerization.

In the dehydration step, the dehydration is preferably performed by heating in an inert gas atmosphere. The dehydration step is performed in a reaction vessel, and the distillate containing water is discharged outside the reaction vessel. Water to be dehydrated in the dehydration step includes hydrated water contained in the raw materials charged in the dehydration step, an aqueous medium of the aqueous mixture, water produced by a side reaction between the raw materials, and the like.

The heating temperature in the dehydration step is not particularly limited as long as the heating temperature is 300° C. or lower but is preferably from 100 to 250° C. The heating time is preferably from 15 minutes to 24 hours, and more preferably from 30 minutes to 10 hours.

In the dehydration step, the dehydration is performed until the water content reaches a predetermined range. That is, in the dehydration step, the dehydration is preferably performed until the content becomes preferably 0 to 2 mol, and more preferably from 0.5 to 1.8 mol, per 1 mol of the effective sulfur source. When the water content is too small in the dehydration step, the water content needs to be adjusted to a desired content by adding water in the preparation step performed before the polymerization step.

Preparation Step

The preparation step is a step that prepares a mixture containing an organic amide solvent, a sulfur source, water, a dihalo aromatic compound, and an alkali metal hydroxide in an amount that is less than an equimolar amount per 1 mol of the sulfur source. The mixture prepared in the preparation step is also referred to as "preparation mixture".

In the case where the dehydration step is performed, the amount of the sulfur source in the preparation mixture (hereinafter, also referred to as the amount of "charged sulfur source" (effective sulfur source)) can be calculated by subtracting the molar quantity of the hydrogen sulfide volatilized in the dehydration step from the molar quantity of the sulfur source charged in the dehydration step.

The number of moles of the alkali metal hydroxide per 1 mol of the sulfur source (charged sulfur source) is preferably in a range of 0.5 to 0.99 mol, more preferably 0.7 to 0.98 mol, even more preferably 0.75 to 0.97 mol, and particularly preferably 0.8 mol or greater but less than 0.95 mol. The number of moles of the alkali metal hydroxide is calculated based on the number of moles of the alkali metal hydroxide added in the preparation step. In the case where the dehydration step is performed, the number of moles of the alkali metal hydroxide is calculated based on the number of moles of the alkali metal hydroxide added in the dehydration step and the number of moles of the alkali metal hydroxide generated due to generation of hydrogen sulfide in the dehydration step. When the sulfur source contains an alkali metal sulfide, the number of moles of the alkali metal hydroxide per 1 mol of the sulfur source (charged sulfur source) is calculated in a manner that the number of moles of the alkali metal sulfide is included. When the sulfur source contains hydrogen sulfide, the number of moles of the alkali metal hydroxide per 1 mol of the sulfur source (charged sulfur source) is calculated in a manner that the number of moles of the generated alkali metal sulfide is included. However, the number of moles of the alkali metal hydroxide added for other purposes, such as the number of moles of the alkali metal hydroxide in the case where the organic carboxylic acid metal salt is used in a form of a combination of an organic carboxylic acid and an alkali metal hydroxide as a polymerization aid and/or a phase separation agent, is not included in the number of moles of the alkali metal hydroxide per 1 mol of the sulfur source (charged sulfur source). Furthermore, in the case where at least one type of acid selected from the group consisting of inorganic acids and organic acids is used for some reasons, the number of moles of the alkali metal hydroxide required to neutralize the at least one type of acid is not included in the number of moles of the alkali metal hydroxide per 1 mol of the sulfur source (charged sulfur source).

In the case where the dehydration step is performed, as necessary, in the preparation step, an alkali metal hydroxide and water can be added to the mixture remaining in the system after the dehydration step. In particular, the alkali metal hydroxide is added such that the number of moles of the alkali metal hydroxide is less than 1 mol per 1 mol of the sulfur source (charged sulfur source) taking the amount of the hydrogen sulfide generated during the dehydration and the amount of the alkali metal hydroxide generated during the dehydration into account.

When the number of moles of the alkali metal hydroxide per 1 mol of the sulfur source is less than 1 mol, generation of byproducts during polymerization reaction may be suppressed, the nitrogen content derived from impurities in the produced PAS may be made sufficiently small, and the yield of the PAS may be sufficiently enhanced. In the preparation step, a preparation mixture containing preferably from 0.95 to 1.2 mol, and more preferably from 1 to 1.09 mol, of the dihalo aromatic compound per 1 mol of the sulfur source is preferably prepared.

Note that, as the organic amide solvent, the sulfur source, the dihalo aromatic compound, and the alkali metal hydroxide, those typically used in production of PAS can be used. Examples of the organic amide solvent include amide compounds, such as N,N-dimethylformamide and N,N-dimethylacetamide; N-alkylcaprolactam compounds, such as N-methyl-ε-caprolactam; N-alkylpyrrolidone compounds or N-cycloalkylpyrrolidone compounds, such as N-methyl-2-pyrrolidone (NMP) and N-cyclohexyl-2-pyrrolidone; N,N-dialkylimidazolidinone compounds, such as 1,3-dialkyl-2-imidazolidinone; tetraalkyl urea compounds, such as tetramethyl urea; and hexaalkylphosphate triamide compounds, such as hexamethyl phosphate triamide.

Examples of the sulfur source include alkali metal sulfide, alkali metal hydrosulfide, and hydrogen sulfide.

Examples of the alkali metal hydrosulfides include lithium hydrosulfide, sodium hydrosulfide, potassium hydrosulfide, rubidium hydrosulfide, and cesium hydrosulfide.

Examples of the dihalo aromatic compounds include o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide, and dihalodiphenyl ketone. A halogen atom is each atom of fluorine, chlorine, bromine, and iodine, and the two halogen atoms in the dihalo aromatic compound may be the same or different.

As the alkali metal hydroxide, lithium hydroxide, sodium hydroxide, potassium hydroxide, rubidium hydroxide, and cesium hydroxide can be used.

These materials may be used alone or may be used by mixing two or more types as long as the combination can produce the PAS.

Polymerization Step

The polymerization step is a step that polymerizes PAS by subjecting the sulfur source and the dihalo aromatic compound to a polymerization reaction. The polymerization step includes two steps which are a first-stage polymerization step and a second-stage polymerization step. Each of the steps will be described below.

First-Stage Polymerization Step

The first-stage polymerization step is a step that initiates a polymerization reaction by heating the mixture and produces a prepolymer having a dihalo aromatic compound conversion ratio of 50% or greater.

To shorten the polymerization cycle time, the polymerization reaction method may be a method that uses two or more reaction vessels. In the first-stage polymerization step and the second-stage polymerization step, the reaction system may be in a uniformly dissolved state or may be a phase-separated state. In many cases, in the first-stage polymerization step, the polymerization reaction is performed in the reaction system in which the produced polymer is uniformly dissolved in the organic amide solvent.

In the first-stage polymerization step, preferably, a polymerization reaction is initiated by heating the mixture prepared in the preparation step, i.e. the preparation mixture, to a temperature of 170 to 270° C. and a prepolymer having a dihalo aromatic compound conversion ratio of 50% or greater is produced. The polymerization temperature in the first-stage polymerization step is preferably selected from the range of 180 to 265° C. from the perspective of suppressing side reactions and decomposition reactions.

The dihalo aromatic compound conversion ratio is preferably from 50 to 98%, more preferably from 60 to 97%, even more preferably from 65 to 96%, and particularly preferably from 70 to 95%. The conversion ratio of the dihalo aromatic compound can be calculated by determining the amount of the dihalo aromatic compound remaining in the reaction mixture by gas chromatography and then performing calculation based on the remaining amount of the dihalo aromatic compound, the charged amount of the dihalo aromatic compound, and the charged amount of the sulfur source.

The amount of at least one type of water, the alkali metal hydroxide, and the organic amide solvent may be varied in the middle of the polymerization reaction. For example, water and the alkali metal hydroxide may be added to the reaction system in the middle of the polymerization. However, in the first-stage polymerization step, typically, the preparation mixture prepared in the preparation step is preferably used to initiate the polymerization reaction and terminate the first-stage polymerization reaction.

Second-Stage Polymerization Step

The second-stage polymerization step is a step that heats the mixture that has undergone the alkali addition step and the concentration step described below and continues the polymerization reaction.

For the polymerization temperature in the second-stage polymerization step, the polymerization reaction is continued while heating the mixture to preferably 245 to 290° C., and more preferably 257 to 285° C. The polymerization temperature may be maintained at a fixed temperature or may be increased or decreased stepwise as necessary. The polymerization temperature is preferably maintained at a fixed temperature from the perspective of controlling the polymerization reaction. The polymerization reaction time is typically in the range of from 10 minutes to 72 hours, and preferably from 30 minutes to 48 hours.

In the second-stage polymerization step, the phase-separated polymerization, in which the polymerization reaction is continued in a condition where a concentrated polymer phase and a dilute polymer phase are phase-separated in a reaction system in the presence of a phase separation agent, may be performed. Specifically, by adding a phase separation agent, the polymerization reaction system (polymerization reaction mixture) is phase-separated into the concentrated polymer phase (phase mainly containing dissolved PAS) and the dilute polymer phase (phase mainly containing organic amide solvent). The phase separation agent may be added at the beginning of the second-stage polymerization step, or the phase separation agent may be added in the middle of the second-stage polymerization step such that the phase separation occurs in the middle of the second-stage polymerization step. Note that, although the phase separation agent may be present not only in the second-stage polymerization step, the phase separation agent is preferably used in the second-stage polymerization step.

As the phase separation agent, at least one type selected from the group consisting of organic carboxylic acid metal salts, organic sulfonic acid metal salts, alkali metal halides, alkaline earth metal halides, alkaline earth metal salts of aromatic carboxylic acids, phosphoric acid alkali metal salts, alcohols, paraffin hydrocarbons, and water can be used. Among these, water or an organic carboxylic acid metal salt is preferable because of low cost and ease in post-treatment, and an organic carboxylic acid salt is particularly preferable from the perspective of reaction pressure in the second-stage polymerization. The salts may be in forms obtained by separately adding corresponding acids and bases.

The amount of the phase separation agent to be used varies depending on the type of compound to be used, and the amount is typically in a range of 0.01 to 20 mol per 1 kg of the organic amide solvent.

Alkali Addition Step

The alkali addition step is a step that adds an alkali metal hydroxide to the mixture that has undergone the first-stage polymerization step such that the amount of the alkali metal hydroxide is not less than equimolar amount per 1 mol of the sulfur source.

In the alkali addition step, the amount of the added alkali metal hydroxide is, for example, from 0.01 to 0.6 mol, preferably from 0.02 to 0.4 mol, more preferably from 0.03 to 0.35 mol, and particularly preferably from 0.06 to 0.3 mol, per 1 mol of the sulfur source. In the alkali addition step, the alkali metal hydroxide is preferably added in a regulated manner that the total amount of the alkali metal hydroxide is preferably from 1.00 to 1.10 mol, more preferably from 1.01 to 1.08 mol, and even more preferably from 1.02 to 1.06 mol, per 1 mol of the sulfur source. When the total amount of the alkali metal hydroxide per 1 mol of the sulfur source is too small, PAS having a desired degree of polymerization may not be obtained. The total amount of the alkali metal hydroxide is the total of the amount of the alkali metal hydroxide present in the preparation mixture, the amount of the alkali metal hydroxide added in the alkali addition step, and the amount of the alkali metal hydroxide optionally added in the first-stage polymerization step.

In the alkali addition step, the alkali metal hydroxide may be added at once or intermittently or continuously. When the alkali metal hydroxide is not added in the alkali addition step, formation of byproducts may not be suppressed, the amount of impurities may be increased, and it may become difficult to stably obtain PAS having a high melt viscosity.

Concentration Step

The concentration step is a step that removes at least a part of the organic amide solvent and/or at least a part of the water in the mixture that has undergone the first-stage polymerization step. The method of removing at least a part of the organic amide solvent and/or at least a part of the water is not particularly limited, and publicly known methods can be used. Examples thereof include heating, reducing pressure (including vacuuming), and combinations of these.

In the concentration step, the organic amide solvent is preferably removed until the amount of the organic amide solvent relative to the amount of the sulfur source becomes preferably 300 g/mol or less, more preferably 200 g/mol or less, even more preferably 150 g/mol or less, and particularly preferably 100 g/mol or less. The lower limit of the amount of the organic amide solvent relative to the amount of the sulfur source is not particularly limited and is preferably 50 g/mol or greater, and more preferably 75 g/mol or greater. Furthermore, in the concentration step, the water is preferably removed until the amount of the water relative to the amount of the sulfur source becomes preferably 2.0 mol/mol or less, more preferably 1.0 mol/mol or less, even more preferably 0.5 mol/mol or less, and most preferably 0.0 mol/mol. When the amount of the organic amide solvent and/or the water relative to the amount of the sulfur source is within the range described above, the produced amount of PAS per unit volume can be effectively increased.

In the concentration step, at least a part of the organic amide solvent and/or at least a part of the water is preferably removed until the ratio of water/organic amide solvent becomes preferably 0.005 mol/g or less, more preferably 0.003 mol/g or less, even more preferably 0.001 mol/g or less, and most preferably 0 mol/g. When the ratio of water to organic amide solvent is within the range described above, the reaction pressure in the second-stage polymerization step is reduced, and use of special apparatus, such as high-pressure reaction vessels, can be effectively avoided.

The water is preferably removed in the concentration step until the reaction pressure in the second-stage polymerization step becomes preferably 1.0 MPa or less, more preferably 0.7 MPa or less, even more preferably 0.5 MPa or less, and particularly preferably 0.4 MPa or less. Use of special apparatus, such as high-pressure reaction vessels, can be effectively avoided by removing the water in the concentration step such that the reaction pressure in the second-stage polymerization step is within the range described above.

In the second-stage polymerization step, the organic amide solvent and/or the water is preferably removed in the concentration step until the weight of the reaction mixture relative to the amount of the sulfur source becomes preferably 500 g/mol or less, more preferably 400 g/mol or less, and even more preferably 350 g/mol or less. When the weight of the reaction mixture relative to the amount of the sulfur source is within the range described above, the amount of the organic amide solvent and/or the water in the reaction mixture can be sufficiently reduced, and the produced amount of PAS per unit volume can be effectively increased.

In the method of producing PAS according to an embodiment of the present invention, the concentration step may be performed after the alkali addition step, or the alkali addition step may be performed after the concentration step. In the case where the concentration step is performed after the alkali addition step, generation of alkali metal hydroxide and hydrogen sulfide can be effectively suppressed due to the reaction between the alkali metal hydrosulfide used as the sulfur source and the water. In the case where the alkali addition step is performed after the concentration step, generation of byproducts can be effectively suppressed due to the reaction of the alkali metal hydroxide, the organic amide solvent, and the dihalo aromatic compound.

PAS Polymerization Reaction Solution

In an embodiment of the present invention, generation of byproduct is suppressed in the method of producing PAS that polymerizes the sulfur source and the dihalo aromatic compound in the organic amide solvent in the PAS polymerization reaction solution after the initiation of the polymerization reaction (hereinafter, also simply referred to as "PAS polymerization reaction solution").

Note that the byproduct refers to CPMABA.

Hereinafter, the produced amount of CPMABA in the PAS polymerization reaction solution and the measurement method thereof are described.

Produced Amount of CPMABA

The lower limit of the produced amount of CPMABA relative to the amount of the sulfur source in the PAS polymerization reaction solution is preferably 0 μg/mmol but may be approximately 100 μg/mmol.

The content of CPMABA in the PAS polymerization reaction solution (hereinafter, also referred to as "produced amount of CPMABA") can be measured by the following method.

A slurry content that is in the reactor and that contains the PAS after the completion of the polymerization reaction is cooled to room temperature, and then, using a part thereof, only a liquid component is isolated via centrifugal separation. The isolated liquid component is precisely weighed in a volumetric flask, mixed with an aqueous solution having 40 mass % of acetonitrile content, and then agitated to extract CPMABA. The solution in which the CPMABA is extracted is filtered using a membrane filter, and the content of the CPMABA is measured using this filtrate as a measurement sample. The measurement is performed by using the synthesized CPMABA as a standard substance by high-performance liquid chromatography (HPLC) to quantify the CPMABA relative to the amount of the sulfur source in the measurement sample. This quantity is used as the produced amount of the CPMABA (unit: μg/mmol).

Post-Treatment Step

The post-treatment step is a step of obtaining polyarylene sulfide by removing unnecessary components from the slurry obtained in the polymerization step. The post-treatment step in the method of producing PAS of an embodiment of the present invention is not particularly limited as long as the step is a step typically used in production of PAS.

After the completion of the polymerization reaction, a slurry containing the polymer (hereinafter, also referred to as "product slurry") may be obtained by cooling the reaction mixture, for example. The cooled product slurry is separated by filtration as is or after diluted with water or the like, then washed and filtered repeatedly, and dried, whereby PAS can be recovered.

According to the method of producing PAS of an embodiment of the present invention, a granular PAS can be produced especially in the case where the polymerization reaction is continued in the condition where the reaction system is phase-separated into a concentrated polymer phase and a dilute polymer phase in the presence of a phase separation agent in the second-stage polymerization step. Thus, a method by which the granular polymer is separated from the reaction solution by a method of sieving using a screen is preferable from the perspective of easily separating the polymer from byproducts, oligomers, and the like. As a result, the granular PAS of 30 μm or greater, preferably 35 μm or greater, and particularly preferably 50 μm or greater, can be effectively retrieved. Note that, with the product slurry, the polymer may be sieved as is at a high temperature.

Furthermore, according to the method of producing PAS of an embodiment of the present invention, when the polymerization reaction is performed in a homogeneous liquid phase condition in the first-stage polymerization step and the second-stage polymerization step, fine powder PAS can be produced. Thus, the fine powder polymer can be isolated from the reaction solution by various solid-liquid separation methods. This fine powder PAS has a narrow particle size distribution and high homogeneity. Therefore, sieving is not necessary to control the particle size distribution for this fine powder PAS.

After various solid-liquid separation, the PAS may be washed with the organic amide solvent, which is the same as the polymerization solvent, or an organic solvent, such as ketones (e.g., acetone) and alcohols (e.g., methanol). Furthermore, the PAS may be washed with high temperature water or the like. The produced PAS may be treated with acids or salts, such as ammonium chloride.

Obtained PAS

According to the method of producing PAS of an embodiment of the present invention, formation of byproduct is suppressed, and high quality PAS having less impurities can be obtained. As the PAS obtained by the production method of the present invention, PAS having excellent handleability and excellent fluidity and having less impurity components can be obtained at a high yield by setting the average particle size to typically 10 to 5000 μm, preferably 30 to 4000 and even more preferably 50 to 3000 and a melt viscosity, measured at a temperature of 310° C. and a shear rate of 1216 sec$^{-1}$, to typically 0.1 to 150 Pa·s, preferably 0.5 to 130 Pa·s, more preferably 1 to 100 Pa·s, and even more preferably 5 to 80 Pa·s. Note that the melt viscosity of PAS can be measured by using approximately 20 g of dried polymer and using a capirograph at a predetermined temperature and shear rate.

The PAS obtained by the method of producing PAS of an embodiment of the present invention can be formed into various injection molded products or extrusion molded products, such as sheets, films, fibers, and pipes, as is or after undergoing oxidative-crosslinking, alone or by blending with various inorganic fillers, fibrous fillers, and various synthetic resins, as desired.

The PAS obtained by the method of producing PAS of an embodiment of the present invention exhibits excellent color tone. Furthermore, the PAS compound obtained by the production method of an embodiment of the present invention produces a less amount of volatile components and is suitable for fields, such as electronic devices, where suppression of volatile components is expected.

In the method of producing PAS of an embodiment of the present invention, the PAS is not particularly limited and is preferably polyphenylene sulfide (PPS).

The present invention is not limited to the embodiments described above, and various modifications are possible within the scope indicated in the claims. Embodiments obtained by appropriately combining the technical means disclosed by the embodiments are also included in the technical scope of the present invention. In addition, all of the documents disclosed in the present specification are hereby incorporated by reference.

EXAMPLES

Embodiments of the present invention will be described in further detail hereinafter using examples. The present invention is not limited to the examples below, and it goes without saying that various aspects are possible with regard to the details thereof.

Example 1

1. Preparation Step

In a 1 L autoclave (reactor) made from titanium, 44.90 g (0.501 mol; however, 0.011 mol of sodium sulfide ($Na_2S$) was contained) of a sodium hydrosulfide (NaSH) aqueous solution (concentration by iodimetry of 62.55 mass %; concentration by neutralization titration of 61.09 mass %) as a sulfur source, 22.85 g (0.419 mol) of a sodium hydroxide (NaOH) aqueous solution (concentration of 73.30 mass %), and 500.6 g of N-methyl-pyrrolidone (NMP) were charged. Thereafter, 1.88 g (0.046 mol) of NaOH (concentration of 97 mass %), 4.57 g (0.254 mol) of water ($H_2O$), and 77.26 g (0.526 mol) of p-dichlorobenzene (pDCB) were charged in the reactor. In the case where the charged sulfur source is S, the composition ratios in the reactor at this time were as follows: NMP/S was 1000 g/mol, $H_2O$/S was 4.0 mol/mol, NaOH/S was 0.950 mol/mol, and pDCB/S was 1.050 mol/mol.

2. First-Stage Polymerization Step

The first-stage polymerization step was performed as follows: The temperature was continuously raised from 208° C. to 216° C. over 18 minutes while the preparation mixture was stirred by rotating a stirrer installed in the reactor. Then, the mixture was heated while the temperature was continuously raised to 260° C. over 126 minutes. The pDCB conversion ratio at this time was 89%.

3. Alkali Addition Step

In the reactor which was cooled and opened once, 2.06 g (0.05 mol) of granular NaOH with purity of 97 mass % was charged. The mixture was then sufficiently stirred. The NaOH/S in the reactor at this time was 1.050 mol/mol.

4. Concentration Step

The mixture in the reactor was heated to 80° C. in a vacuum to distill away 450.5 g of the NMP, 63.13 g of the water, and 8.46 g of the pDCB. The composition ratios in the reactor at this time were as follows: NMP/S was 100 g/mol, $H_2O$/S was 0.0 mol/mol, NaOH/S was 1.050 mol/mol, and pDCB/S was 0.935 mol/mol.

5. Second-Stage Polymerization Step

In the reactor, 4.78 g (0.032 mol) of pDCB was charged. The pDCB/S in the reactor at this time was 1.000 mol/mol. The mixture was reacted by heating with stirring at a temperature of 260° C. for 60 minutes. Thereafter, the mixture was cooled to room temperature. The pDCB conversion ratio at this time was 100%.

6. Washing and Drying Step 10 g of the reaction mixture was dispersed in 100 g of water, sufficiently stirred, and filtered using a glass filter. The filtered mixture was dispersed again in 100 g of water, sufficiently stirred, and filtered using a glass filter. This operation was repeated three times, and the filtered mixture was heated to 80° C. in a vacuum and dried to obtain a powder polymer.

The weight of the reaction mixture relative to the amount of the sulfur source in the second-stage polymerization step (reaction mixture weight/S), the reached maximum reaction pressure, the produced amount of the byproduct CPMABA after the first-stage polymerization step, and the content of the CPMABA in the collected polymer are shown together in Table 1.

Comparative Example 1

The first-stage polymerization step was performed in the same manner as in Example 1 except for employing the NaOH/S of 1.050 mol/mol in the preparation step, and not performing the NaOH addition in the alkali addition step. The pDCB conversion ratio at the completion of the first-stage polymerization was 86.6%, and the pDCB/S after the concentration step was 0.909 mol/mol. The concentration step, the second-stage polymerization step, and the washing and drying step were performed in the same manner as in Example 1 except for charging 6.64 g (0.045 mol) of the pDCB in the reactor in the second-stage polymerization step. In the same manner as in Example 1, the results are shown in Table 1.

Comparative Example 2

The preparation step and the first-stage polymerization step were performed in the same manner as in Comparative Example 1. The following alkali addition step and concentration step were not performed, and water addition was performed in the second-stage polymerization step to adjust the $H_2O$/S to 7.0 mol/mol. The reaction was performed by heating at 265° C. for 150 minutes. The weight of the reaction mixture relative to the amount of the sulfur source in the second-stage polymerization step (reaction mixture weight/S) and the reached maximum reaction pressure are shown in Table 1.

Comparative Example 3

The first-stage polymerization step was performed in the same manner as in Comparative Example 2 except for employing the NMP/S of 300 g/mol, the $H_2O$/S of 1.4 mol/mol, the NaOH/S of 1.08 mol/mol, and the pDCB/S of 1.060 mol/mol in the preparation step. However, a dewatering step was performed to remove water originating from the NaSH and NaOH aqueous solutions as a pretreatment of the preparation step. The following alkali addition step and concentration step were not performed similarly to Comparative Example 2, and water addition was performed in the second-stage polymerization step to adjust the $H_2O$/S to 2.1 mol/mol. The reaction was performed by heating in the same manner as in Comparative Example 2. In the same manner as in Comparative Example 2, the results are shown in Table 1.

TABLE 1

| | | | Examples | Comparative Example 1 |
|---|---|---|---|---|
| First-stage polymerization step | NMP/S | (g/mol) | 1000 | 1000 |
| | H2O/S | (mol/mol) | 4.0 | 4.0 |
| | NaOH/S | (mol/mol) | 0.94 | 1.05 |
| | p-DCB/S | (mol/mol) | 1.05 | 1.05 |
| Alkali addition step | NaOH/S | (mol/mol) | 0.94 → 1.05 | — |
| Concentration step | NMP/S | (g/mol) | 1000 → 100 | 1000 → 100 |
| | H2O/S | (mol/mol) | 4.0 → 0.0 | 4.0 → 0.0 |
| Second-stage polymerization step | NMP/S | (g/mol) | 100 | 100 |
| | H2O/S | (mol/mol) | 0.0 | 0.0 |
| | H2O/NMP | (mol/g) | 0.000 | 0.000 |
| | NaOH/S | (mol/mol) | 1.05 | 1.05 |
| | p-DCB/S | (mol/mol) | 1.00 | 1.00 |
| | Reaction mixture weight/S | (g/mol) | 334 | 334 |
| | Maximum reaction pressure | (MPa) | 0.3 | 0.3 |
| Produced amount of byproduct (CPMABA/S) | | (μg/mmol) | 4439 | 5314 |
| CPMABA content of collected polymer | | (ppm) | 120 | 281 |

| | | | Comparative Example 2 | Comparative Example 3 |
|---|---|---|---|---|
| First-stage polymerization step | NMP/S | (g/mol) | 1000 | 300 |
| | H2O/S | (mol/mol) | 4.0 | 1.4 |
| | NaOH/S | (mol/mol) | 1.05 | 1.08 |
| | p-DCB/S | (mol/mol) | 1.05 | 1.06 |
| Alkali addition step | NaOH/S | (mol/mol) | — | — |
| Concentration step | NMP/S | (g/mol) | — | — |
| | H2O/S | (mol/mol) | — | — |
| Second-stage polymerization step | NMP/S | (g/mol) | 1000 | 300 |
| | H2O/S | (mol/mol) | 7.0 | 2.1 |
| | H2O/NMP | (mol/g) | 0.007 | 0.007 |
| | NaOH/S | (mol/mol) | 1.05 | 1.08 |
| | p-DCB/S | (mol/mol) | 1.05 | 1.06 |
| | Reaction mixture weight/S | (g/mol) | 1361 | 575 |
| | Maximum reaction pressure | (MPa) | 2.1 | 2.1 |
| Produced amount of byproduct (CPMABA/S) | | (μg/mmol) | 5314 | 10136 |
| CPMABA content of collected polymer | | (ppm) | — | — |

The comparison between Example 1 and Comparative Example 1 shows that the produced amount of CPMABA which is a byproduct can be reduced and the amount of CPMABA contained in the collected polymer after the washing can be also reduced by performing the first-stage polymerization step by allowing NaOH to be contained in an amount that is less than an equimolar amount relative to the amount of the sulfur source and by performing the second-stage polymerization step by allowing NaOH to be contained in an amount that is not less than an equimolar amount relative to the amount of the sulfur source by the alkali addition step. The comparison of Example 1, Comparative Example 1, Comparative Example 2, and Comparative Example 3 shows that, by performing the concentration step, reduction in the weight of the reaction mixture in the second-stage polymerization step relative to the amount of the sulfur source and reduction in the maximum reaction pressure reached in the second-stage polymerization step were achieved, and it was made possible to perform the polymerization in a simple reactor that had a smaller size and a lower pressure resistance.

INDUSTRIAL APPLICABILITY

The method of producing PAS according to an embodiment of the present invention can be used as a suitable method of producing PAS that is widely used as an engineering plastic in fields, such as electric/electronic devices, and devices for automobiles.

The invention claimed is:

1. A method of producing polyarylene sulfide comprising:
a preparation step of preparing a mixture containing an organic amide solvent, a sulfur source, water, a dihalo aromatic compound, and an alkali metal hydroxide in an amount less than an equimolar amount per 1 mol of the sulfur source;
a first-stage polymerization step of initiating a polymerization reaction by heating the mixture and producing a prepolymer having a conversion ratio of the dihalo aromatic compound of 50% or greater;
an alkali addition step of adding the alkali metal hydroxide, in an amount not less than an equimolar amount per 1 mol of the sulfur source, into the mixture that has undergone the first-stage polymerization step;
a concentration step of removing at least a part of the organic amide solvent and/or at least a part of the water in the mixture that has undergone the first-stage polymerization step; and
a second-stage polymerization step of heating the mixture that has undergone the alkali addition step and the concentration step and continuing the polymerization reaction,
wherein in the concentration step, the water is removed until an amount of the water relative to the amount of the sulfur source becomes 2.0 mol/mol or less.

2. The method according to claim 1, wherein in the preparation step, a mixture containing from 0.5 to 0.99 mol of the alkali metal hydroxide per 1 mol of the sulfur source is prepared.

3. The method according to claim 1, wherein in the preparation step, a mixture containing 0.5 mol or greater but less than 0.95 mol of the alkali metal hydroxide per 1 mol of the sulfur source is prepared.

4. The method according to claim 1, wherein in the concentration step, the organic amide solvent is removed until an amount of the organic amide solvent relative to an amount of the sulfur source becomes 300 g/mol or less.

5. The method according to claim 1, wherein in the concentration step, at least a part of the organic amide solvent and/or at least a part of the water is removed until a ratio of the water to the organic amide solvent becomes 0.005 mol/g or less.

6. The method according to claim 1, wherein the water is removed in the concentration step until a reaction pressure in the second-stage polymerization step becomes 1.0 MPa or less.

7. The method according to claim 1, wherein in the second-stage polymerization step, the organic amide solvent and/or the water is removed in the concentration step until a weight of the reaction mixture relative to an amount of the sulfur source becomes 500 g/mol or less.

8. The method according to claim 1, wherein the concentration step is performed after the alkali addition step.

9. The method according to claim 1, wherein the alkali addition step is performed after the concentration step.

* * * * *